United States Patent [19]

Röck

[11] 4,325,649
[45] Apr. 20, 1982

[54] JOINING DEVICE FOR CONNECTING TWO FURNITURE PARTS

[75] Inventor: Erich Röck, Höchst, Austria

[73] Assignee: Julius Blum Gesellschaft m.b.H., Höchst, Austria

[21] Appl. No.: 128,922

[22] Filed: Mar. 10, 1980

[30] Foreign Application Priority Data

Mar. 12, 1979 [AT] Austria ................................. 1811/79

[51] Int. Cl.³ ............................................... B25G 3/00
[52] U.S. Cl. ..................................... 403/231; 403/407
[58] Field of Search ............... 403/407, 231, 245, 230, 403/323

[56] References Cited
U.S. PATENT DOCUMENTS

| | | | |
|---|---|---|---|
| 3,695,655 | 10/1972 | Wippermann | 403/403 |
| 3,966,340 | 6/1976 | Morris | 403/353 |
| 4,060,949 | 12/1977 | Busse | 52/285 |

FOREIGN PATENT DOCUMENTS 2358163  6/1974  Fed. Rep. of Germany ...... 403/231

*Primary Examiner*—Andrew V. Kundrat
*Attorney, Agent, or Firm*—Wenderoth, Lind & Ponack

[57] ABSTRACT

A joining device for connecting furniture parts includes two structural members each being a dowel housing and both having the same diameter.

One housing has a connecting member and the other housing has a locking member. When joined the connecting member projects into the housing with the locking member and is held by the latter.

1 Claim, 3 Drawing Figures

JOINING DEVICE FOR CONNECTING TWO FURNITURE PARTS

BACKGROUND OF THE INVENTION

1. Field of the Invention

The present invention relates to a joining device for connecting two furniture parts comprising an anchoring housing designed as a dowel housing adapted to be inserted into one furniture part, a locking member being mounted in the anchoring housing, the locking member locking a connecting member anchored in the other furniture part.

2. Description of the Prior Act

In prior art joining devices for furniture parts one structural member, which is a dowel housing, is fastened to a furniture wall and another structural member, which is a dowel pin, is fastened to the top-or bottom plate of the piece of furniture. The locking member generally comprises a hook which is concentric with respect to the rotational axis of the locking member rotatably mounted in the structural member, the cross-section of the hook being tapered towards its tip, whereas an abutment is provided on the dowel pin. When turned, the hook of the locking member is pressed on the abutment, and the pin is pulled into the dowel housing by the inclined face of the hook.

SUMMARY OF THE INVENTION

It is, therefore, the object of the present invention to provide an improved joining device of the above-described type so that the manner of mounting one structural member in the furniture part is simplified and that the hold of this member in the furniture part is improved. Moreover, the production of pieces of furniture shall be simplified by means of the present invention.

According to the invention, this is achieved by providing a connecting member comprising a connecting pin extending into the housing with the locking member and an insertion housing moulded to the connecting pin and adapted to be inserted into one furniture part, the insertion housing also being designed as a dowel housing and the connecting pin being arranged on the periphery of the insertion housing.

An essential advantage of the present invention is that both work pieces, i.e. both furniture parts, have to be drilled only at the sides. Many dowel drilling machines require a turning of the drill beam, when drilling on front faces. This requires a certain amount of time for resetting the tool.

Moreover, the support of the joining device in accordance with the present invention in the furniture parts is substantially improved as compared with a connector comprising only a dowel pin as one connecting part.

It is preferably provided that the periphery of the insertion housing is planar in the region of the connecting pin and lies in the plane of the front face of the furniture part when in the mounted position.

For drilling the holes, it is advantageous that both housings of the joining device have the same diameter.

BRIEF DESCRIPTION OF THE DRAWINGS

In the following an embodiment of the present invention will be described in more detail, with reference to the accompanying drawings wherein.

DESCRIPTION OF THE PREFERRED EMBODIMENT

Figure 1:
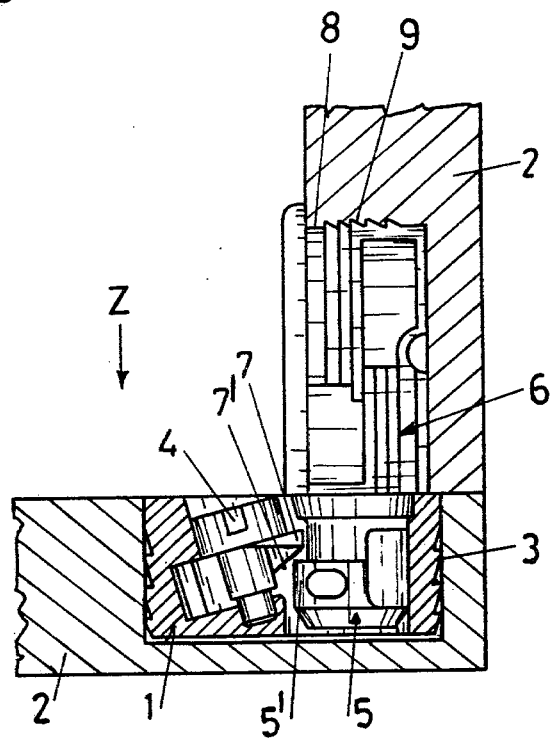
FIG. 1 is a partial sectional view of the connection of furniture parts of means of a joining device in accordance with the present invention.

The joining device in accordance with the present invention comprises a housing 1 adapted to be inserted into a hole in the side of a furniture part 2, connection to the furniture part 2, being achieved by ribs 3 on the housing 1.

A locking member 4 is mounted in the housing 1. A connecting pin 5 is moulded to an insertion housing 6. Both housings 1 and 6 are designed as dowel housings, i.e. the two structural members are preferably each made in one piece of injection moulded plastics material. The insertion housing 6 has also clamping ribs 9 on its outer face 8.

Figure 2:
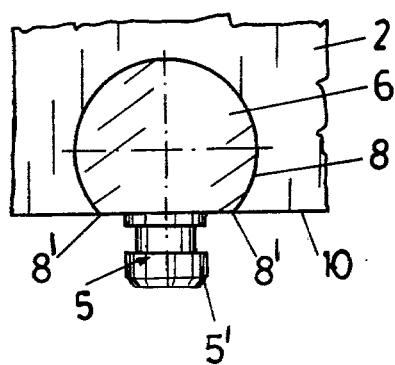
FIG. 2 is a top view of an insertion housing in accordance with the present invention and FIG. 3 is a perspective exploded view of the joining device.
Figure 3:
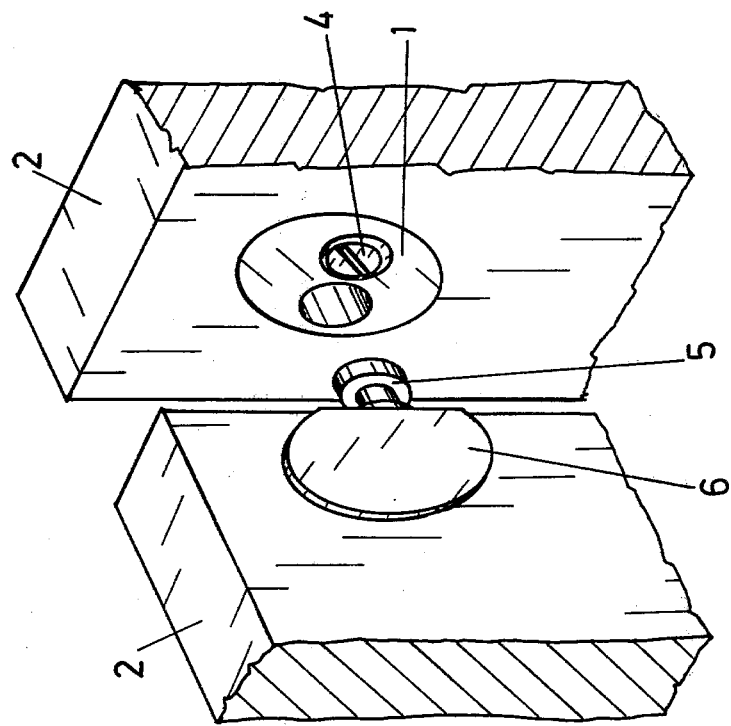

In the region of the connecting pin 5 the periphery 8 of the insertion housing 6 is planar (FIG. 2 region 8') and lies in the plane of the front face 10 of the furniture part 2.

The connecting pin 5 has a projection 5' against which a hook 7 of the locking member 4 rests in the mounted position. The hook 7 is provided with an inclined face 7'.

For connecting the two furniture parts 2 the two dowel housings, i.e. the housing 1 and the insertion housing 6, are each pressed into the sides of the respective furniture parts 2.

Subsequently, the two furniture parts 2 are superposed in their correct position, i.e. the connecting pin 5 projects into an opening in the housing 1. Then the locking member 4 is turned in such a manner that the hook 7 rests with its inclined face 7' against the lateral projection 5' of the connecting pin 5 and pulls connecting pin 5 into the dowel housing 1 in the direction of arrow Z, as illlustrated in FIG. 1.

It is obvious that the furniture parts 2 provided with the fittings in accordance with the present invention can be easily disassembled.

What is claimed is:

1. A joining device for connecting two flat furniture parts, said joining device comprising:

a dowel-shaped first housing adapted to be rigidly fixed within a hole in a side wall of a first flat furniture part, said first housing having therein an outwardly facing opening;

a dowel-shaped second housing adapted to be rigidly fixed within a hole in a side wall of a second flat furniture part, said second housing having a planar edge surface adapted to be in coplanar alignment with the plane of an end surface of the second flat furniture part when said second housing is fixed within the hole in the side wall of the second flat furniture part, the diameter of said first housing being equal to the diameter of the said second housing and said second housing having a stop flange at one end thereof;

a connecting pin integral with and extending outwardly from said planar edge surface of said second housing, said connecting pin extending into said opening in said first housing, said connecting pin including a projection; and locking means rotatably mounted in said first housing for, upon rotation thereof, acting upon said projection and moving said connecting pin axially inwardly of said opening and for thereby moving the end surface of the second flat furniture part into abutment with the side wall of the first flat furniture part.

* * * * *